(12) United States Patent
Watanabe et al.

(10) Patent No.: US 11,446,876 B2
(45) Date of Patent: Sep. 20, 2022

(54) THREE-DIMENSIONAL SHAPING APPARATUS AND METHOD OF MANUFACTURING THREE-DIMENSIONAL SHAPING OBJECT

(71) Applicant: Seiko Epson Corporation, Tokyo (JP)

(72) Inventors: Yusuke Watanabe, Shiojiri (JP); Yuki Yamamoto, Shiojiri (JP); Kenta Anegawa, Matsumoto (JP)

(73) Assignee: Seiko Epson Corporation

( * ) Notice: Subject to any disclaimer, the term of this patent is extended or adjusted under 35 U.S.C. 154(b) by 335 days.

(21) Appl. No.: 16/583,355

(22) Filed: Sep. 26, 2019

(65) Prior Publication Data

US 2020/0101672 A1    Apr. 2, 2020

(30) Foreign Application Priority Data

Sep. 27, 2018 (JP) .............................. JP2018-181461

(51) Int. Cl.
| | |
|---|---|
| *B29C 64/393* | (2017.01) |
| *B29C 64/295* | (2017.01) |
| *B29C 64/245* | (2017.01) |
| *B33Y 30/00* | (2015.01) |
| *B33Y 50/02* | (2015.01) |
| *B33Y 10/00* | (2015.01) |

(52) U.S. Cl.
CPC .......... *B29C 64/393* (2017.08); *B29C 64/245* (2017.08); *B29C 64/295* (2017.08); *B33Y 10/00* (2014.12); *B33Y 30/00* (2014.12); *B33Y 50/02* (2014.12)

(58) Field of Classification Search
CPC ... B29C 64/393; B29C 64/245; B29C 64/295; B33Y 10/00; B33Y 30/00; B33Y 50/02
USPC ......................................... 264/40.6; 425/375
See application file for complete search history.

(56) References Cited

U.S. PATENT DOCUMENTS

| | | | |
|---|---|---|---|
| 2009/0025638 A1 | 1/2009 | Inoue | |
| 2016/0096326 A1 | 4/2016 | Naware | |
| 2016/0176118 A1* | 6/2016 | Reese | ................... B29C 64/295 425/89 |

(Continued)

FOREIGN PATENT DOCUMENTS

| | | |
|---|---|---|
| JP | H04-168036 A | 6/1992 |
| JP | H09-506553 A | 6/1997 |

(Continued)

*Primary Examiner* — Joseph S Del Sole
*Assistant Examiner* — Lawrence D. Hohenbrink, Jr.
(74) *Attorney, Agent, or Firm* — Harness, Dickey & Pierce, P.L.C.

(57) ABSTRACT

A three-dimensional shaping apparatus includes a discharge portion discharging a shaping material, a shaping stage on which the shaping material discharged from the discharge portion is stacked, a temperature adjustment portion provided in the shaping stage to adjust a temperature of the shaping stage, and a control portion. The control portion stacks the shaping material on the shaping stage to shape and cure a three-dimensional shaping object while changing a relative position between the discharge portion and the shaping stage, and then, heats or cools a portion of the cured three-dimensional shaping object in contact with the shaping stage by controlling the temperature adjustment portion to adjust the temperature of the shaping stage.

6 Claims, 10 Drawing Sheets

(56) References Cited

U.S. PATENT DOCUMENTS

| | | | |
|---|---|---|---|
| 2016/0221269 A1 | 8/2016 | Okamoto et al. | |
| 2016/0288415 A1* | 10/2016 | Fromm | B33Y 10/00 |
| 2017/0190120 A1* | 7/2017 | Bloome | B33Y 50/02 |
| 2017/0317259 A1* | 11/2017 | Hatch | B29C 64/295 |
| 2018/0029125 A1 | 2/2018 | Okamoto et al. | |

FOREIGN PATENT DOCUMENTS

| | | |
|---|---|---|
| JP | 2006-192710 A | 7/2006 |
| JP | 2016-104555 A | 6/2016 |
| JP | 2016-141085 A | 8/2016 |
| JP | 2017-121719 A | 7/2017 |
| JP | 2017-200727 A | 11/2017 |
| JP | 2017-217791 A | 12/2017 |
| JP | 2018-020547 A | 2/2018 |
| WO | 2007-013240 A1 | 2/2007 |

\* cited by examiner

THREE-DIMENSIONAL SHAPING APPARATUS AND METHOD OF MANUFACTURING THREE-DIMENSIONAL SHAPING OBJECT

The present application is based on, and claims priority from, JP Application Serial Number 2018-181461, filed Sep. 27, 2018, the disclosure of which is hereby incorporated by reference herein in its entirety.

BACKGROUND

1. Technical Field

The present disclosure relates to a three-dimensional shaping apparatus.

2. Related Art

For example, JP-A-2016-192710 discloses a three-dimensional shaping apparatus shaping a three-dimensional shaping object by stacking a shaping material extruded from an extrusion nozzle on a shaping stage.

In such a three-dimensional shaping apparatus, if adhesion between a shaping material constituting a three-dimensional shaping object and a shaping stage is high after completion of shaping of the three-dimensional shaping object, there is a case where deformation or breakage may occur in the three-dimensional shaping object when the three-dimensional shaping object is separated from the shaping stage.

SUMMARY

An advantage of some aspects of the present disclosure is to provide a technology capable of facilitating separation of the three-dimensional shaping object from the shaping stage after shaping in the three-dimensional shaping apparatus.

An aspect of a technology of the present disclosure is provided as a three-dimensional shaping apparatus. The three-dimensional shaping apparatus includes a discharge portion discharging a shaping material, a shaping stage on which the shaping material discharged from the discharge portion is stacked, a moving portion changing a relative position between the discharge portion and the shaping stage, a temperature adjustment portion provided in the shaping stage to adjust a temperature of the shaping stage, and a control portion controlling the discharge portion, the moving portion, and the temperature adjustment portion, in which the control portion stacks the shaping material on the shaping stage to shape and cure a three-dimensional shaping object while changing the relative position between the discharge portion and the shaping stage, and then, heats or cools a portion of the cured three-dimensional shaping object in contact with the shaping stage by the temperature adjustment portion.

DESCRIPTION OF EXEMPLARY EMBODIMENTS

1. First Embodiment

Figure 1:
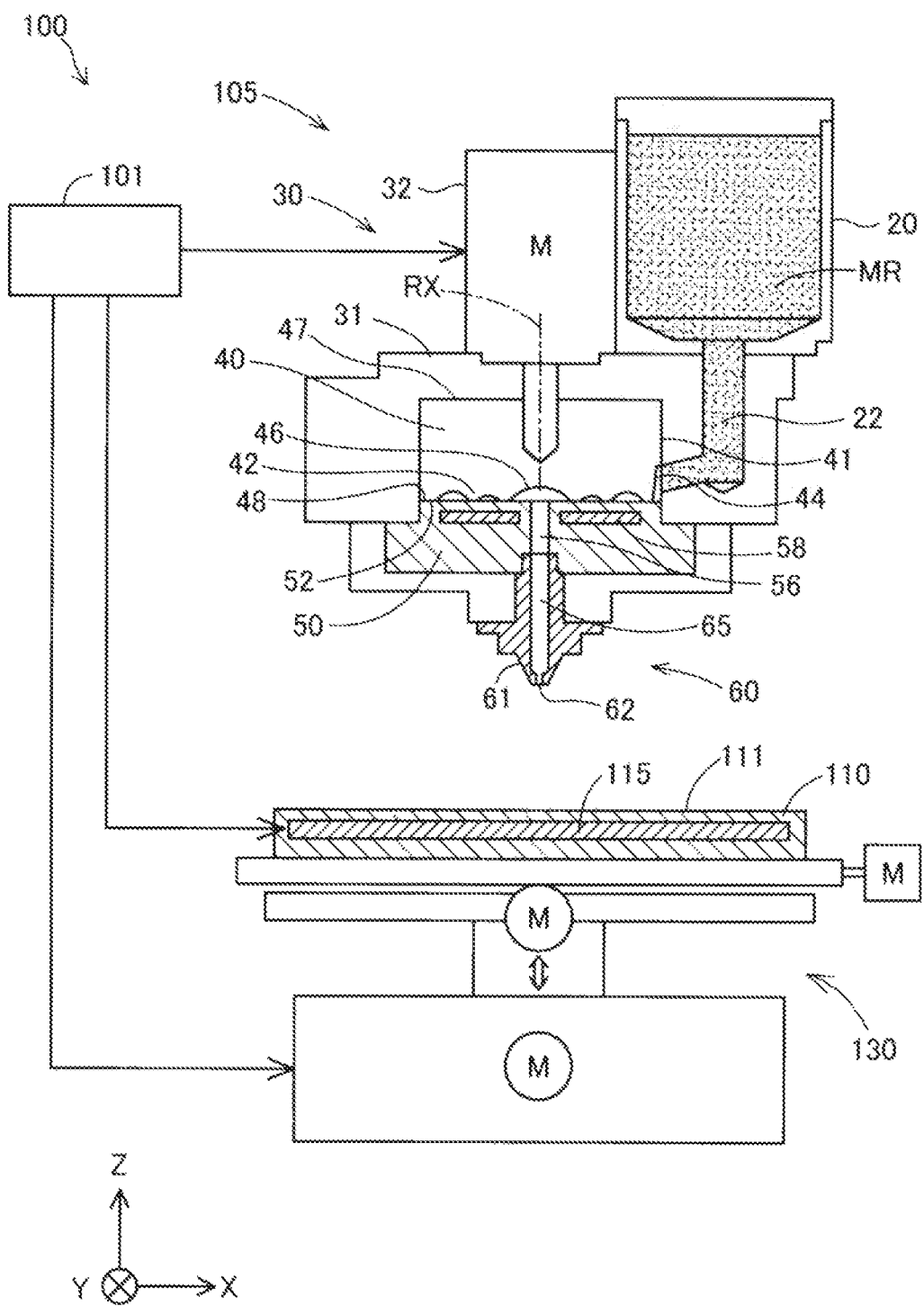
FIG. 1 is a schematic view showing a configuration of a three-dimensional shaping apparatus.

FIG. 1 is a schematic view showing a configuration of a three-dimensional shaping apparatus 100 in a first embodiment. In FIG. 1, arrows indicating X, Y, and Z directions orthogonal to one another are shown. The X direction indicated by the arrow X and the Y direction indicated by the arrow Y are directions parallel to a horizontal plane. The Z direction indicated by the arrow Z is a direction opposite to a vertical direction. The vertical direction may be rephrased as a gravity direction. The arrows indicating the X, Y, and Z directions are also shown appropriately in other reference figures so as to correspond to FIG. 1.

The three-dimensional shaping apparatus 100 shapes a three-dimensional shaping object by stacking a shaping material on a shaping surface 111 of a shaping stage 110. In the following, a "three-dimensional shaping apparatus" is simply referred to as a "shaping apparatus", and the three-dimensional shaping object is simply referred to as a "shaping object". In the present disclosure, a "surface" of the shaping surface 111 is a concept including not only a surface configured as a plane but also a surface which is understood as a surface occupying a certain area when viewed as a whole, such that for example, a projection may be formed on the surface.

In addition to the shaping stage 110, the shaping apparatus 100 also includes a control portion 101 which controls the entire shaping apparatus 100, a shaping portion 105 which generates and discharges the shaping material, and a moving portion 130 which controls a stacking position of the shaping material on the shaping stage 110.

The control portion 101 controls overall operation of the shaping apparatus 100. In the first embodiment, the control portion 101 is constituted with a computer including at least one processor and a main storage apparatus. The control portion 101 performs various functions by a processor executing a program and an instruction read on the main storage apparatus. Further, at least part of the functions of the control portion 101 may be realized by a hardware circuit.

The control portion 101 performs a shaping processing by controlling the shaping portion 105 and the moving portion 130 and stacking the shaping material on the shaping surface 111 of the shaping stage 110 to shape the shaping object, in accordance with shaping data representing the shaping object in the shaping step to be described later. Further, as described later, the control portion 101 performs processing of changing a temperature of the shaping stage 110 in order to facilitate separation of the shaping object from the shaping stage 110, in the shaping step.

The shaping portion 105 includes a material supply portion 20 which is a source of a material MR which is a raw material of the shaping material, a generation portion which generates the shaping material obtained by plasticizing at least a portion of the material MR, and a discharge portion 60 which discharges the shaping material. In the present disclosure, "plasticization" means that heat is applied to a material having thermoplasticity to melt the material. In the following description, when "plasticize the material MR" or "melt the material MR" are mentioned, it means that a thermoplastic material contained in material MR is plasticized to be melted so that material MR has fluidity as a whole.

The material supply portion 20 is constituted with, for example, a hopper which accommodates the material MR. The material supply portion 20 has a discharge port in a downward direction. The discharge port is coupled to the generation portion 30 via a communication passage 22. In the first embodiment, a material in which at least a part of components contained in the material is plasticized to be softened when heated, is used as the material MR. In the first embodiment, the material MR contains a thermoplastic resin such as an ABS resin as a component to be softened by such heating. The material MR is accommodated in the hopper, for example, in a form of a pellet. Specific examples of the material MR will be described later.

The generation portion 30 melts the material MR supplied from the material supply portion 20 to generate a paste-like shaping material exhibiting fluidity, and guides the shaping material to the discharge portion 60. The generation portion 30 includes a case 31, a drive motor 32, a flat screw 40, and a screw facing portion 50.

The flat screw 40 is a type of rotor, and has a substantially cylindrical shape whose dimension in an axial direction, which is a direction along a central axis thereof, is smaller than a diameter thereof. The flat screw 40 is disposed such that the axial direction is parallel to the Z direction, and rotates along a circumferential direction. In the first embodiment, the central axis of the flat screw 40 coincides with an axis of rotation RX thereof. In FIG. 1, the axis of rotation RX of the flat screw 40 is illustrated by an alternate long and short dash line.

The flat screw 40 is housed in a hollow case 31 opened in a direction opposite to the Z direction. An upper surface 47 side of the flat screw 40 is coupled to the drive motor 32 via a top surface portion of the case 31, and the flat screw 40 rotates in the case 31 by a rotational drive force generated by the drive motor 32. The drive motor 32 drives under control of the control portion 101.

Figure 2:
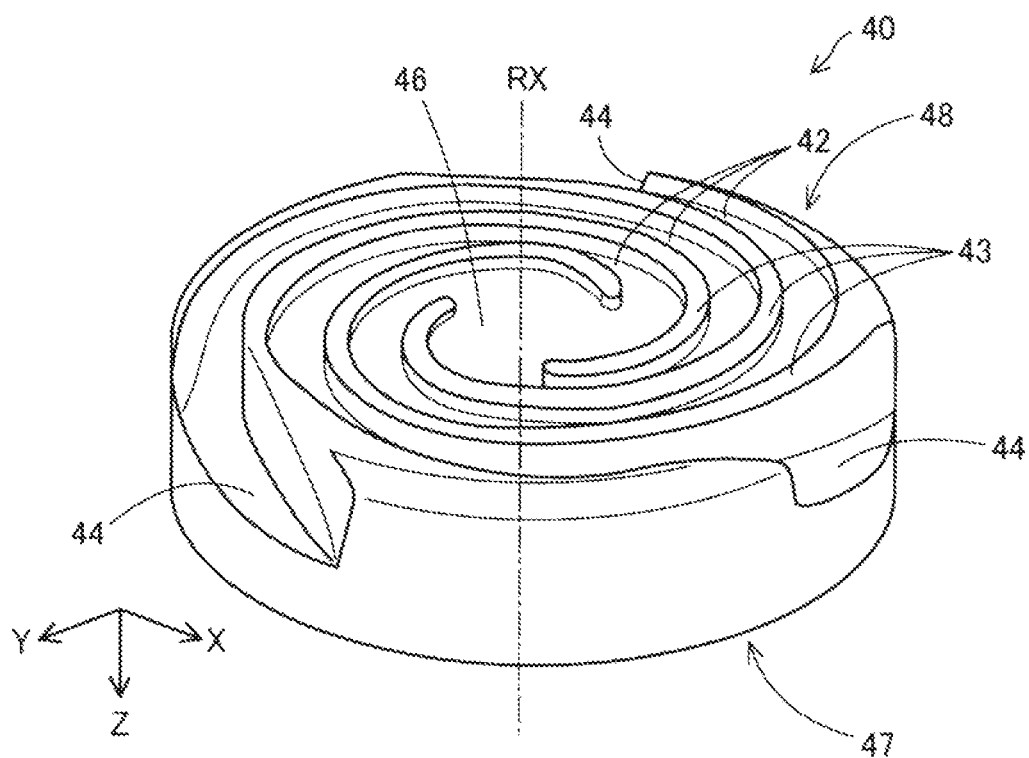
FIG. 2 is a schematic perspective view showing a configuration of a flat screw.

In the flat screw 40, a scroll groove 42 is formed on a lower surface 48 which is a surface intersecting with the axis of rotation RX. Hereinafter, the lower surface 48 of the flat screw 40 is also referred to as a "groove formation surface 48". As illustrated in FIG. 2 to be referred to later, the scroll groove 42 is coupled to a material inlet 44 which opens at an outer circumferential side surface 41 of the flat screw 40. The scroll groove 42 spirally extends toward a center portion 46 which is recessed in the Z direction and through which the axis of rotation RX of the flat screw 40 passes, from the material inlet 44.

The groove formation surface 48 of the flat screw 40 faces an upper surface 52 of the screw facing portion 50, and space is formed between the scroll groove 42 of the groove formation surface 48 and the upper surface 52 of the screw facing portion 50. The communication passage 22 of the material supply portion 20 described above is coupled to the scroll groove 42 through the material inlet 44. In the shaping portion 105, the material MR is supplied from the material supply portion 20 through the communication passage 22 to the above-mentioned space between the scroll groove 42 and the screw facing portion 50. Specific configurations of the flat screw 40 and the scroll groove 42 will be described later.

The screw facing portion 50 is embedded with a heater 58 to heat the material MR supplied into the scroll groove 42 of the rotating flat screw 40. The material MR supplied into the scroll groove 42 of the flat screw 40 is converted into a shaping material while being melted in the scroll groove 42 and flowing along the scroll groove 42 toward the center portion 46 by rotation of the flat screw 40. The paste-like shaping material which is guided to the center portion 46 and exhibits fluidity is supplied to the discharge portion 60 through a communication hole 56 provided at a center of the screw facing portion 50. In the shaping material, all types of substances constituting the shaping material do not have to be melted. The shaping material may be converted into a state having fluidity as a whole by melting at least one type of substance among the substances constituting the shaping material.

The discharge portion 60 includes a nozzle 61 discharging the shaping material, and a flow path 65 guiding the shaping material generated in the generation portion 30 to a nozzle 61. The nozzle 61 is coupled to the communication hole 56 of the screw facing portion 50 through the flow path 65 provided along the Z direction. The flow path 65 may be provided with a valve mechanism or the like which controls a flow of the shaping material. The nozzle discharges the shaping material generated in the generation portion 30 from a discharge port 62 at a tip thereof toward the shaping stage 110.

The shaping stage 110 is made of, for example, a base material such as a metal plate. The shaping stage 110 is disposed below the discharge portion 60 so that the shaping surface 111 faces the discharge port 62 of the nozzle 61. In the first embodiment, the shaping stage 110 is disposed so that the shaping surface 111 is substantially horizontal, that is, parallel to the X and Y directions.

Inside the shaping stage 110, a temperature adjustment portion 115 adjusting a temperature of the shaping surface 111 under control of the control portion 101 is provided. In the first embodiment, the temperature adjustment portion 115 is constituted with a heating unit which heats the shaping surface 111 from below. The temperature adjustment portion 115 is constituted with, for example, a heater. Temperature control of the shaping stage 110 by the temperature adjustment portion 115 will be described later.

The moving portion 130 changes the relative positional relationship between the shaping stage 110 and the nozzle 61 under the control of the control portion 101. In the first embodiment, a position of the nozzle 61 is fixed, and the moving portion 130 moves the shaping stage 110. The moving portion 130 is constituted with a three-axis positioner which moves the shaping stage 110 in three directions of the X, Y, and Z directions by driving force of three motors M. The shaping stage 110 is configured to be removable with respect to the moving portion 130.

In another embodiment, a configuration may be adopted where instead of moving the shaping stage 110 by the moving portion 130, the moving portion 130 moves the nozzle 61 relative to the shaping stage 110 with a position of the shaping stage 110 fixed. Even in such a configuration, the relative position of the nozzle 61 with respect to the shaping stage 110 can be changed. In another embodiment, a configuration may be adopted where the two moving portions 130 may respectively move the shaping stage 110 and the nozzle 61 to change the relative position of the shaping stage 110 and the nozzle 61.

FIG. 2 is a schematic perspective view showing a configuration of the groove formation surface 48 side of the flat screw 40. In FIG. 2, a position of the axis of rotation RX of the flat screw 40 at the generation portion 30 is illustrated by an alternate long and short dash line.

The center portion 46 of the groove formation surface 48 of the flat screw 40 is constituted with a recess to which one end of the scroll groove 42 is coupled. In the first embodiment, the center portion 46 intersects with the axis of rotation RX and faces the communication hole 56 of the screw facing portion 50 illustrated in FIG. 1. The scroll groove 42 is formed in a spiral shape so as to draw an arc from the center portion 46 to the material inlet 44 on the outer circumferential side surface of the flat screw 40. The scroll groove 42 may be formed in a helical shape. The groove formation surface 48 is provided with a projection strip portion 43 along each scroll groove 42. The projection strip portion 43 constitutes a side wall portion of the scroll groove 42. It is desirable that the scroll groove 42 is configured such that a flow path cross-sectional area of the scroll groove 42 decreases from the material inlet 44 toward the center portion 46. As a result, a pressure of the center portion 46 can be further increased when the material MR is plasticized.

In the first embodiment, the flat screw 40 has the three scroll grooves 42 and the three projection strip portions 43. In another embodiment, the number of the scroll grooves 42 and the projection strip portions 43 provided in the flat screw 40 is not limited to three. Only the one scroll groove 42 may be provided in the flat screw 40, or the two or more scroll grooves 42 may be provided. Further, an arbitrary number of projection strip portions 43 may be provided in accordance with the number of the scroll grooves 42.

In the first embodiment, the material inlets 44 are formed in the flat screw 40 at three places. In another embodiment, the number of the material inlets 44 provided in the flat screw 40 is not limited to three. In the flat screw 40, the material inlet 44 may be provided at only one place, or may be provided at a plurality of places such as two or more places.

Figure 3:
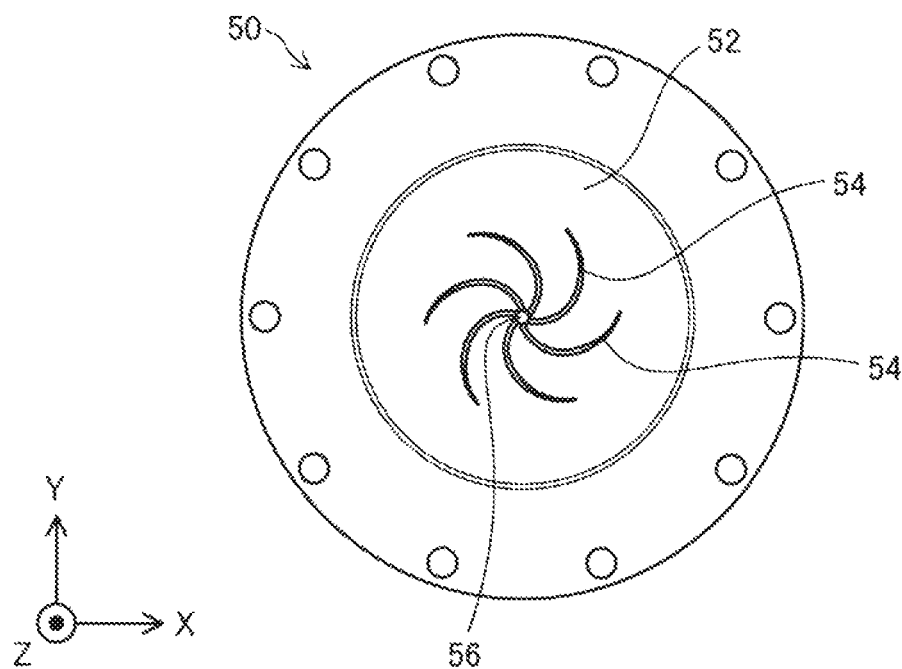
FIG. 3 is a schematic plan view showing a configuration of a screw facing portion.

FIG. 3 is a schematic plan view showing the upper surface 52 side of the screw facing portion 50. The upper surface 52 of the screw facing portion 50 faces the groove formation surface 48 of the flat screw 40 as described above. Hereinafter, the upper surface 52 is also referred to as the "facing surface 52". At a center of the facing surface 52, the communication hole 56 described above for supplying the shaping material to the nozzle 61 is formed. On the facing surface 52, a plurality of spiral guide grooves 54 are formed, which converge while an arc is drawn from an outer circumference of the facing surface 52 to the communication hole 56. The plurality of the guide grooves 54 have a function of guiding the shaping material flowing into the center portion 46 of the flat screw 40 to the communication hole 56. As described with reference to FIG. 1, the screw facing portion 50 has the heater 58 embedded therein. Melting of the material MR in the generation portion 30 is realized by heating by the heater 58 and rotation of the flat screw 40.

Please refer to FIG. 1 and FIG. 2. As the flat screw 40 rotates, the material MR supplied from the material inlet 44 is guided by the scroll groove 42 and moved toward the center portion 46 while being heated in the scroll groove 42. The material MR melts and becomes more fluid as the material MR approaches the center portion 46, and is converted into the shaping material. The shaping material collected in the center portion 46 is guided to the flow path 65 of the nozzle 61 through the communication hole 56 by an internal pressure generated in the center portion 46 and discharged from the discharge port 62.

In the generation portion 30 using the flat screw 40, during plasticization of the material MR, since a pressure in the scroll groove 42 becomes higher as the material MR approaches the center portion 46, degree of kneading of the shaping material to be finally generated is increased. Further, since air present in void of the material MR is extruded to the material inlet 44 side by the pressure generated in the scroll groove 42, deaeration of the shaping material is promoted.

In the generation portion 30, by adopting the flat screw 40 having a small size in the Z direction, a range occupied by a path for melting the material MR and guiding the material MR to the nozzle 61 is reduced in the Z direction. Thus, in the shaping apparatus 100, generation mechanism of the shaping material is miniaturized by using the flat screw 40.

In the shaping apparatus 100, a configuration generating the shaping material having fluidity and pressure-feeding to the nozzle 61 is easily realized by using the flat screw 40. According to the configuration, control of discharge amount of the shaping material from the nozzle 61 is possible by control of a rotation speed of the flat screw 40, and the control of the discharge amount of the shaping material from the nozzle 61 can be facilitated.

Figure 4:
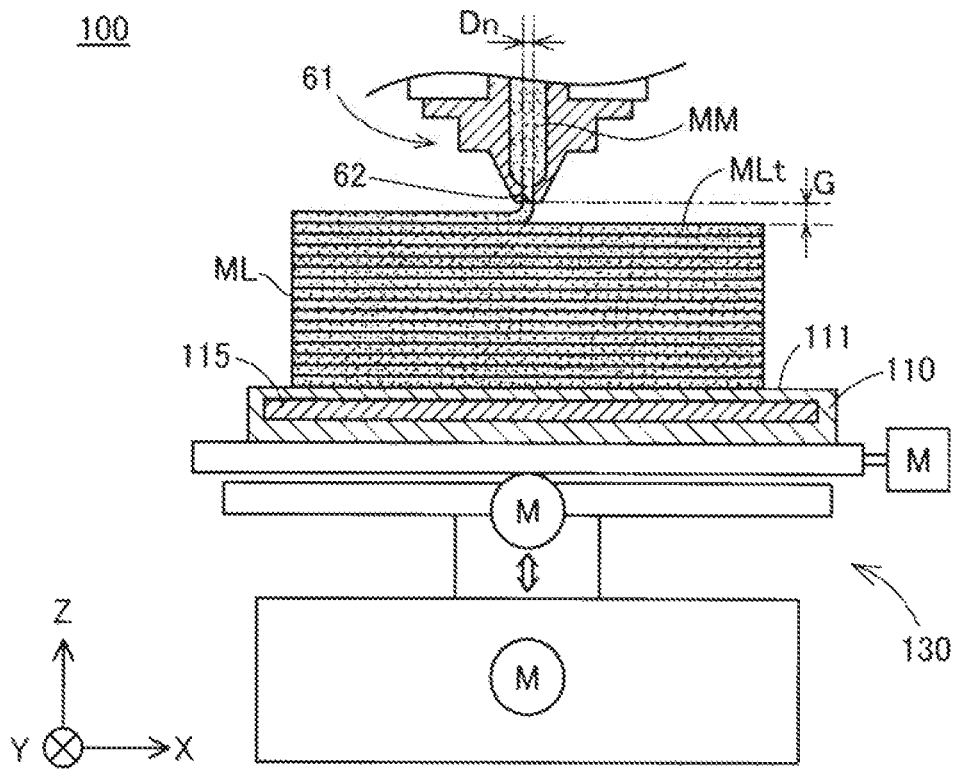
FIG. 4 is a schematic view schematically showing a state of a shaping processing.

FIG. 4 is a schematic view schematically showing how a shaping object is shaped in the shaping apparatus 100. While changing a position of the nozzle 61 with respect to the shaping stage 110 in a direction along the shaping surface 111 of the shaping stage 110, the control portion 101 repeats scanning which discharges the shaping material MM from the nozzle 61 and stacks the shaping material MM to form a material layer ML. The control portion 101 shapes the shaping object by stacking the material layer ML in the Z direction.

When forming the material layer ML, a gap G larger than a hole diameter Dn of the nozzle 61 is formed between the discharge port 62 at the tip of the nozzle 61 and a planned portion MLt where the shaping material MM is stacked. As a result, since the shaping material MM discharged from the discharge port 62 of the nozzle 61 is stacked without being pressed against the planned portion MLt, and a cross-sectional shape of the shaping material MM discharged from the nozzle 61 is suppressed from being crushed, surface roughness of the shaping object can be reduced. Further, in a configuration in which the heater is provided around the nozzle 61, overheating of the shaping material MM by the heater can be prevented by forming the gap G, and discoloration and deterioration of the shaping material MM after stacking due to such overheating can be suppressed.

Figure 5:
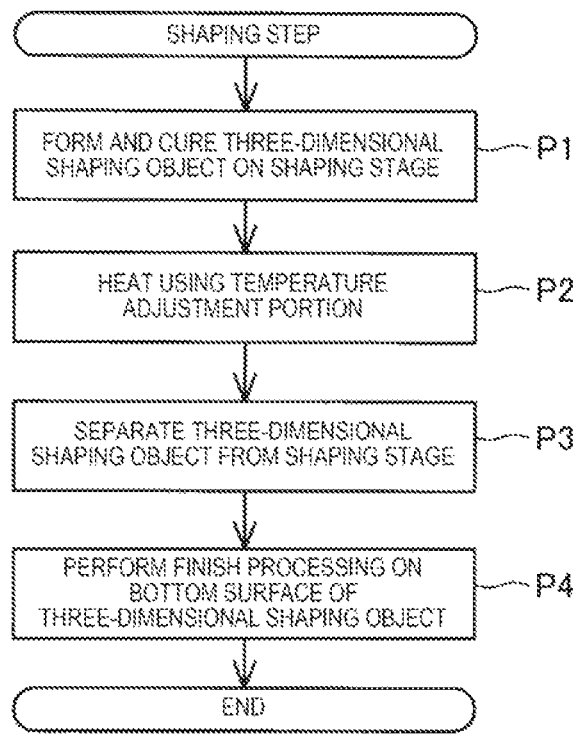
FIG. 5 is an explanatory diagram showing a flow of a shaping step of a first embodiment.

FIG. 5 is an explanatory view showing a flow of a shaping step in the first embodiment. In the first embodiment, the shaping object is manufactured by the following step using the three-dimensional shaping apparatus 100 described above.

In a step P1, the shaping object is shaped on the shaping stage 110 by the three-dimensional shaping apparatus 100. More specifically, as described with reference to FIG. 4, the shaping material is stacked on the shaping surface 111 of the shaping stage 110 to shape the shaping object while the relative position between the nozzle 61 of the discharge portion 60 and the shaping stage 110 is changed.

The control portion 101 may control the temperature adjustment portion 115 to heat the shaping surface 111 of the shaping stage 110 while the discharge portion 60 stacks the shaping material on the shaping surface 111. In this case, it is desirable that the control portion 101 controls the temperature adjustment portion 115 to adjust the temperature of the shaping surface 111 to a temperature higher than a glass transition point of the thermoplastic material included in the shaping material and lower than a melting point thereof. As a result, shrinkage due to temperature decrease of the shaping material in contact with the shaping surface 111 is suppressed, and deformation of the shaping object is suppressed.

In the step P1, after the discharge portion 60 stacks the shaping material on the shaping stage 110 to shape the shaping object, the shaping object of the shaping stage 110 is cured. Specifically, the temperature of the entire shaping object is lowered to a temperature lower than the glass transition point of the thermoplastic material included in the shaping material, and the step waits until hardness of the entire shaping object increases. In the curing step, the step may be waited until the temperature of the shaping object is almost equal to room temperature.

A step P2 is a preparation step performed after curing the shaping object in order to separate the shaping object from the shaping stage 110. In the step P2, the control portion 101 of the three-dimensional shaping apparatus 100 controls the temperature adjustment portion 115 shown in FIG. 1 to instantaneously heat the shaping surface 111 of the shaping stage 110. As a result, a portion of the cured shaping object in contact with the shaping stage 110 is instantaneously heated, and a temperature of the portion is locally increased from a temperature after the shaping object is cured. A heating time by the temperature adjustment portion 115 may be, for example, about 10 seconds. In the first embodiment, the control portion 101 controls the temperature adjustment portion 115 to perform heating such that the temperature of the portion of the cured shaping object in contact with the shaping stage 110 is higher than a glass transition point of a plastic resin included in the shaping material and lower than a melting point thereof.

In a step P3, the shaping object is separated from the shaping stage 110. Since the heating by the temperature adjustment portion 115 in the step P2 described above softens the portion of the shaping object in contact with the shaping stage 110, the shaping object can be easily separated from the shaping stage 110 with a small external force. Further, since the portion of the shaping object in contact with the shaping stage 110 is locally softened, deformation or breakage of the shaping object by the external force applied to the shaping object when the shaping object is separated from the shaping stage 110 is suppressed. In particular, in the first embodiment, as described above in the step P2, the portion of the shaping object in contact with the shaping stage 110 is heated to be at a temperature higher than the glass transition point of the plastic resin included in the shaping material and lower than the melting point thereof and is in a more softened state. Thus, the separation of the shaping object from the shaping stage 110 is further facilitated.

In a step P4, for example, finish processing such as cutting processing and polishing processing is performed on a bottom surface of the shaping object facing the shaping surface 111 of the shaping stage 110. As a result, roughness of the bottom surface of the shaping object is suppressed. In another embodiment, the step P4 may be omitted.

As described above, according to the shaping apparatus 100 and the shaping method of the shaping object in the first embodiment, when separating the shaping object after the curing from the shaping stage 110, the portion of the shaping object in contact with the shaping stage 110 is softened by heating by the temperature adjustment portion 115. Therefore, the separation of the shaping object from the shaping stage 110 is facilitated, and the deformation or breakage of the shaping object by the external force for separating the shaping object from the shaping stage 110 is suppressed. In addition, according to the shaping apparatus 100 and the shaping method of the shaping object in the first embodiment, various working effects described in the first embodiment can be achieved.

2. Second Embodiment

Figure 6:
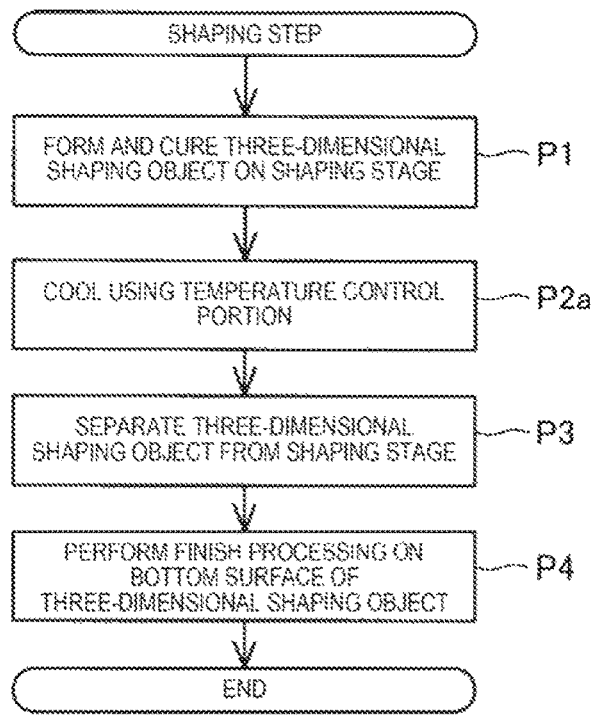
FIG. 6 is an explanatory diagram showing a flow of a shaping step of a second embodiment.

FIG. 6 is an explanatory view showing a flow of a shaping step in a second embodiment. A configuration of the shaping apparatus used in the shaping step of the second embodiment is substantially the same as the configuration of the shaping apparatus 100 of the first embodiment shown in FIG. 1 except that the temperature adjustment portion 115 is configured to heat and cool the shaping surface 111. In the second embodiment, the temperature adjustment portion 115 is constituted with, for example, a heat exchange tube in which a heat fluid for heating and a refrigerant such as liquid nitrogen for cooling flow. In another embodiment, the temperature adjustment portion 115 may be constituted with a peltier element. In the second embodiment, the material MR is not limited to one including the thermoplastic resin. However, it is desirable that the material is easily shrunk by cooling when the shaping object is constituted with the material.

A flow of the shaping step of the second embodiment is substantially the same as the shaping step of the first embodiment shown in FIG. 5 except that a step P2a is performed instead of the step P2 described in the first embodiment, so that the description of the steps P1, P3 and P4 other than the step P2a will be omitted. In the step P1 of the second embodiment, as described in the first embodiment, the shaping object may be shaped in a state where the shaping surface 111 is heated by the temperature adjustment portion 115. When the heating by the temperature adjustment portion 115 is not performed in the step P1, the temperature adjustment portion 115 may be configured to be able to exhibit only a function as a cooling portion.

In the step P2a of the second embodiment, the control portion 101 instantaneously cools the portion of the cured shaping object in contact with the shaping stage 110 by the temperature adjustment portion 115, and lowers a temperature of the portion to a temperature lower than the temperature after the curing of the shaping object is completed. The control portion 101 may lower the temperature of the portion of the cured shaping object in contact with the shaping stage 110 to, for example, a temperature lower than room temperature. As a result, the portion of the shaping object in contact with the shaping stage 110 can shrink, and adhesion of the bottom surface of the shaping object with respect to the shaping stage 110 can be reduced. Therefore, the separation of the shaping object from the shaping stage 110 in the step P3 is facilitated. According to the shaping apparatus and the shaping method of the shaping object in the second embodiment, in addition to the working effects described in the second embodiment, various working effects similar to those described in the first embodiment can be achieved.

3. Third Embodiment

Figure 7:
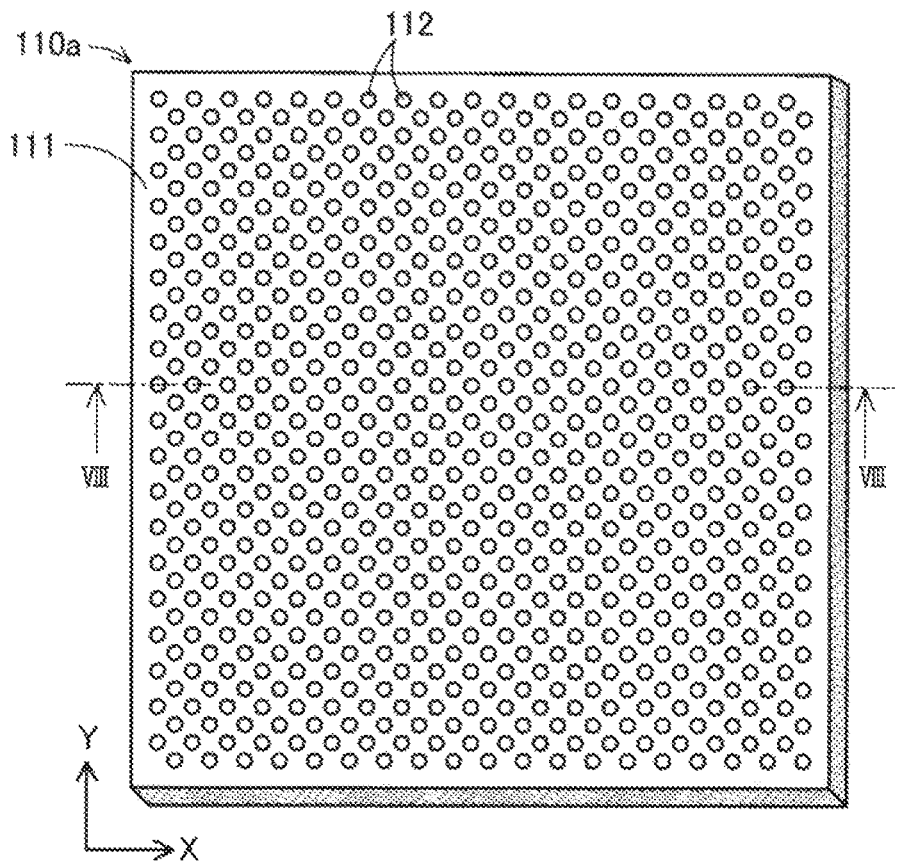
FIG. 7 is a schematic view showing a shaping stage of a third embodiment.

FIG. 7 is a schematic view showing the shaping surface 111 side of a shaping stage 110a included in a shaping apparatus of a third embodiment. A configuration of the shaping apparatus of the third embodiment is substantially the same as the configuration of the shaping apparatus 100 of the first embodiment shown in FIG. 1 except that the shaping stage 110a of the third embodiment is provided instead of the shaping stage 110.

In the shaping stage 110a, a plurality of hole portions 112 are provided on the shaping surface 111 side in an area where the shaping material is stacked in the shaping step. In the first embodiment, each hole portion 112 has, for example, an opening shape in a shape of a perfect circle. In the first embodiment, each hole portion 112 is distributed substantially uniformly throughout the shaping surface 111. An opening diameter of each hole portion 112 may be, for example, about 1 to 10 µm, and a depth thereof may be, for example, about 1 to 10 µm. Further, a distance between the adjacent hole portions 112 may be, for example, about 0.1 to 1 mm. Each hole portion 112 can be formed, for example, by photolithography. In the other embodiments, the opening shape and dimensions of each hole portion 112 are not particularly limited. Further, each hole portion 112 may be provided only in a partial area on the shaping surface 111, or may not be uniformly distributed in an interior surface of the shaping surface 111.

Figure 8A:
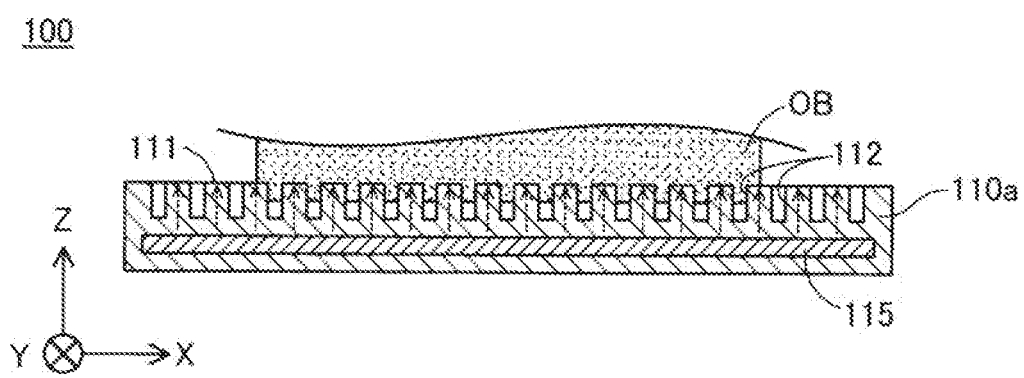
FIG. 8A is a schematic sectional view showing the shaping stage of the third embodiment.
Figure 8B:
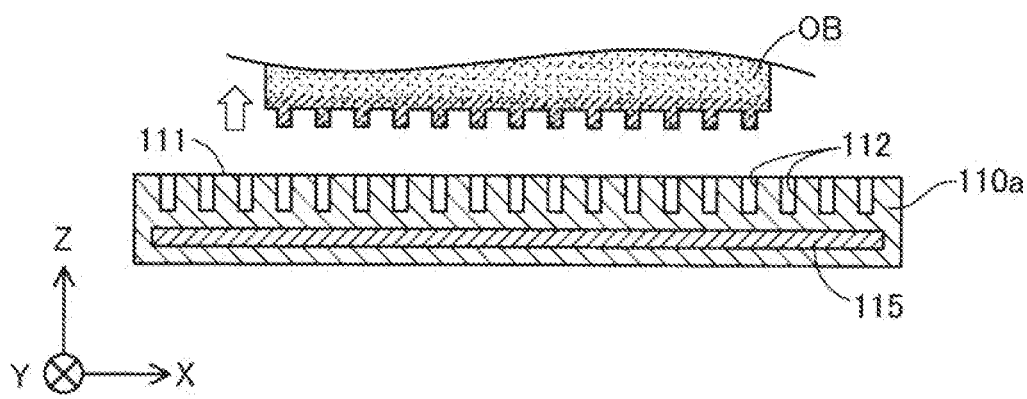
FIG. 8B is a schematic view showing a separating step of separating a three-dimensional shaping object from the shaping stage of the third embodiment.

FIGS. 8A and 8B are schematic sectional views in the section VIII-VIII shown in FIG. 7 of the shaping stage 110a. FIG. 8A shows a state immediately after the shaping object OB is shaped, and FIG. 8B schematically shows a state when the shaping object OB is separated. In the third embodiment, the shaping object OB is shaped by the flow of the shaping step shown in FIG. 5 as in the first embodiment.

Please refer to FIG. 8A. In the step P1, when the shaping object OB is shaped on the shaping stage 110a, an anchor effect is obtained by a part of the shaping material MM constituting the lowest material layer of the shaping object OB entering the hole portion 112 of the shaping stage 110a. Therefore, a fixing property of the shaping material MM with respect to the shaping surface 111 is enhanced, and moving of the shaping material MM to a position deviated from a planned position on the shaping surface 111 is suppressed. Further, when the shaping material MM is cured, shrinkage of the material layer in the lowermost layer of the shaping object OB in the direction along the shaping surface 111 is suppressed, and an occurrence of warpage on the bottom surface of the shaping object OB is suppressed. Thus, in the shaping step of the third embodiment, shaping precision of the shaping object is enhanced by providing the hole portion 112 in the shaping stage 110a.

Please refer to FIG. 8A and FIG. 8B. In the step P2, as described in the first embodiment, the portion of the shaping object OB in contact with the shaping stage 110a is heated by the temperature adjustment portion 115 provided in the shaping stage 110a. As a result, an embedded portion of the shaping object OB in the hole portion 112 of the shaping stage 110a and a portion of the shaping object OB in contact with the shaping surface 111 around the embedded portion soften. In FIG. 8B, the portions softened in the shaping object OB are shown as oblique line hatching. Such partial softening at a lower end of the shaping object OB reduces the anchor effect of the shaping object OB acting on the shaping stage 110a. Therefore, in the step P3, the shaping object OB can be easily separated from the shaping stage 110a, and the generation or deformation of the shaping object OB can be suppressed.

As described above, according to the shaping apparatus and the method of manufacturing the shaping object of the third embodiment, the deformation of the shaping object OB can be suppressed during the shaping, and at the same time, the deformation and breakage of the shaping object OB can be suppressed when the shaping object OB is separated from the shaping stage 110a after the shaping is completed. In addition, according to the shaping apparatus and the method of manufacturing the shaping object of the third embodiment, in addition to the various working effects described in the third embodiment, various working effects similar to those described in the first embodiment can be achieved.

4. Fourth Embodiment

Figure 9:
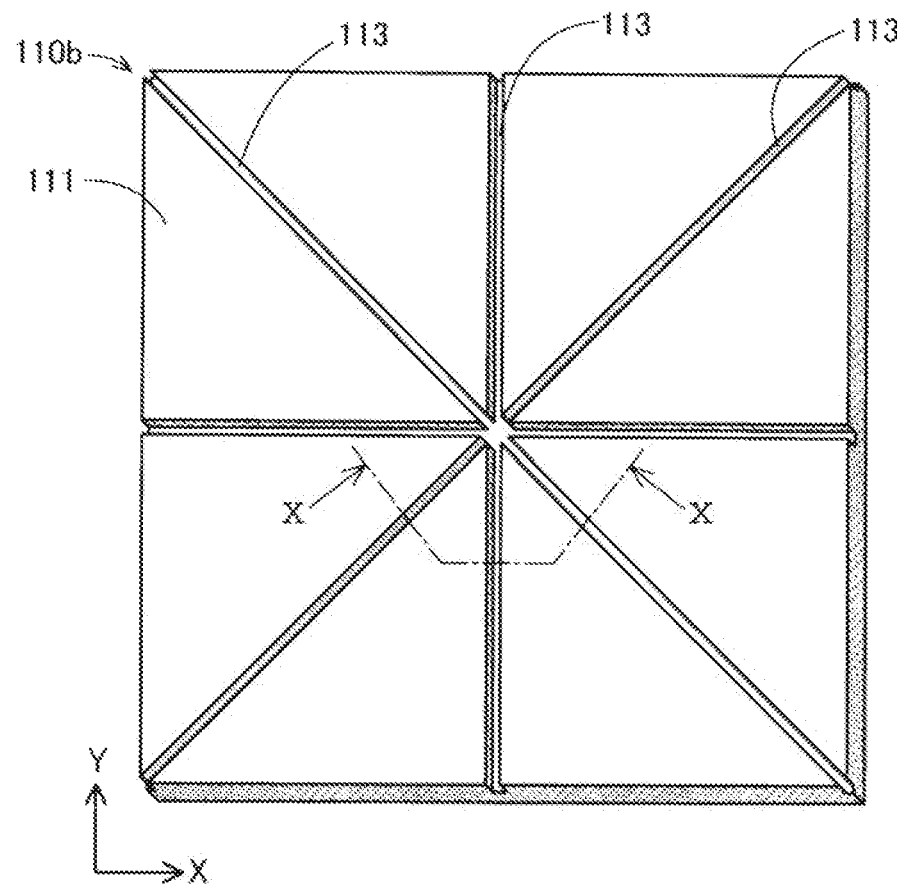
FIG. 9 is a schematic view showing a shaping stage of a fourth embodiment.

FIG. 9 is a schematic view showing the shaping surface 111 side of a shaping stage 110b included in a shaping apparatus of a fourth embodiment. A configuration of the shaping apparatus of the fourth embodiment is substantially the same as the configuration of the shaping apparatus 100 of the first embodiment shown in FIG. 1 except that the shaping stage 110b of the fourth embodiment is provided instead of the shaping stage 110. A configuration of the shaping stage 110b of the fourth embodiment is substantially the same as the configuration of the shaping stage 110a of the third embodiment except that a plurality of groove portions 113 is provided in an area where the shaping material is stacked instead of the plurality of the hole portions 112.

In the shaping stage 110b of the fourth embodiment, the plurality of the groove portions 113 having a linear shape are radially disposed so as to intersect one another at a center of the shaping stage 110b. The groove portion 113 is formed over the entire shaping surface 111. It is desirable that an angle at which the adjacent groove portions 113 intersect one another is uniform. A groove width of each groove portion 113 may be, for example, about 1 to 10 µm. Each groove portion 113 can be formed, for example, by photolithography. In the other embodiments, a shape, a groove width, a disposition pattern, and a formation range of each groove portion 113 are not particularly limited. The groove portion 113 may not be formed in a linear shape, and may be formed, for example, in a curvilinear shape or a wave shape. The groove portion 113 may have different widths at different portions. The groove portions 113 may not be disposed radially, and for example, may be disposed in a lattice. The groove portion 113 may be provided only in a part of the shaping surface 111.

Figure 10A:
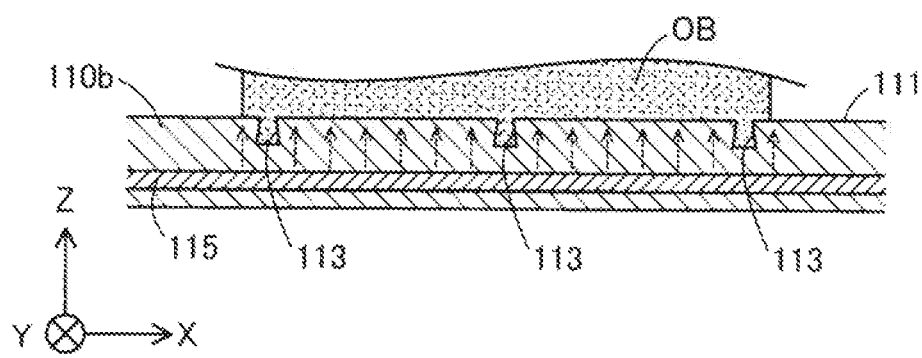
FIG. 10A is a schematic sectional view showing the shaping stage of the fourth embodiment.
Figure 10B:
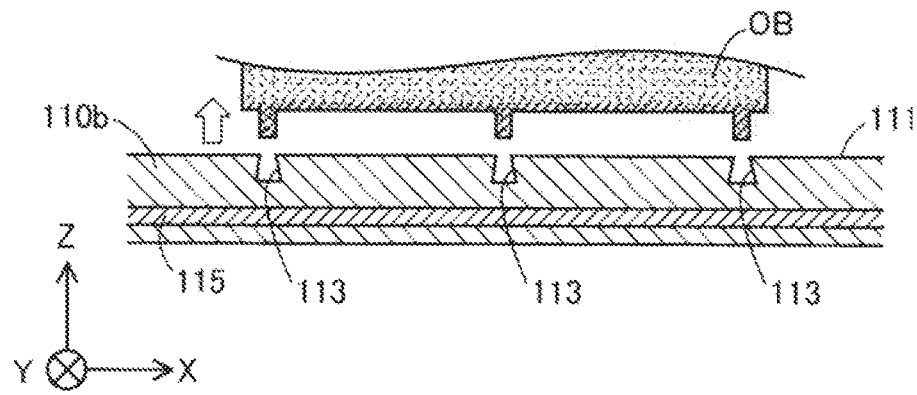
FIG. 10B is a schematic view showing a separating step of separating a three-dimensional shaping object from the shaping stage of the fourth embodiment.

FIG. 10A and FIG. 10B are schematic sectional views of the shaping stage 110b taken along the line X-X shown in FIG. 9. FIG. 10A shows a state immediately after the shaping object OB is shaped, and FIG. 10B schematically shows a state when the shaping object OB is separated. In the fourth embodiment, the shaping object OB is shaped by the flow of the shaping step shown in FIG. 5 as in the first embodiment.

Please refer to FIG. 10A. In the step P1, a fixing property of the shaping material MM with respect to the shaping surface 111 is enhanced by the anchor effect caused by the part of the shaping material MM constituting the lowermost material layer of the shaping object OB being inserted into the groove portion 113, so the shaping precision of the shaping object OB is enhanced. In the fourth embodiment, each groove portion 113 is configured such that the groove width thereof decreases as the groove width approaches a groove opening from a bottom thereof. Therefore, a higher anchor effect can be obtained than in the case where the groove width of each groove portion 113 is constant in the Z direction, and the fixing property of the shaping material MM with respect to the shaping surface 111 is further enhanced.

Please refer to FIG. 10A and FIG. 10B. In the step P2, heating of the temperature adjustment portion 115 provided in the shaping stage 110b softens a portion of the shaping object OB embedded in the groove portion 113 and a portion of a periphery of the embedded shaping object OB in contact with the shaping surface 111. In FIG. 10B, the softened portions in the shaping object OB are shown as oblique line hatching. In the step P2, as in the third embodiment, the partial softening at the lower end of the shaping object OB facilitates the separation of the shaping object OB from the shaping stage 110b. Further, as described above, even in a configuration in which the groove width is reduced in the Z direction, the portion embedded in the groove portion 113 is softened, so the separation of the shaping object OB from the shaping stage 110b is facilitated.

As described above, according to the shaping apparatus and the method of manufacturing the shaping object of the fourth embodiment, the deformation of the shaping object OB can be suppressed during the shaping, and at the same time, the deformation and breakage of the shaping object OB can be suppressed when the shaping object OB is separated from the shaping stage 110b after the shaping is completed. In addition, according to the shaping apparatus and the method of manufacturing the shaping object of the fourth embodiment, in addition to the various working effects described in the fourth embodiment, various working effects similar to those described in the first embodiment and the third embodiment can be achieved.

5. Fifth Embodiment

Figure 11:
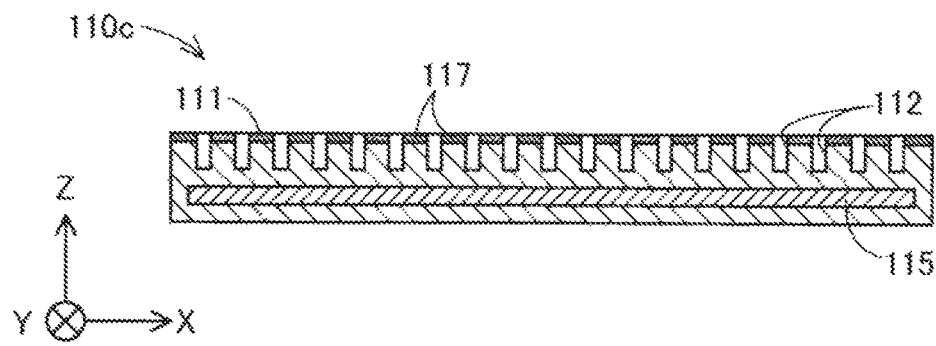
FIG. 11 is a schematic sectional view showing a shaping stage of a fifth embodiment.

FIG. 11 is a schematic sectional view showing a shaping stage 110c provided in a shaping apparatus of a fifth embodiment. A configuration of the shaping apparatus of the fifth embodiment is substantially the same as the configuration of the shaping apparatus 100 of the first embodiment shown in FIG. 1 except that the shaping stage 110c of the fifth embodiment is provided instead of the shaping stage 110. A configuration of the shaping stage 110c of the fifth embodiment is substantially the same as the configuration of the shaping stage 110a of the third embodiment except that a coating layer 117 is provided on the shaping surface 111.

In the shaping stage 110c of the fifth embodiment, a coating layer 117 is formed, where a surface of the shaping stage 110c at a peripheral edge portion of each hole portion 112 is coated with a material having a thermal conductivity relatively higher than that of other portions of the shaping stage 110c. The coating layer 117 covers a planar area between the respective hole portions 112, that is, an area other than the hole portion 112 in the shaping surface 111. In the fifth embodiment, the coating layer 117 is made of a material having a thermal conductivity higher than that of a base material of the shaping stage 110c. The coating layer 117 is formed by plating on the base material of the shaping stage 110c. When the base material of the shaping stage 110c is, for example, stainless steel or nickel, the coating layer 117 can adopt copper, silver or the like. In the shaping stage 110c, by provision of the coating layer 117, a gradient of thermal conductivity is formed between the temperature adjustment portion 115 and the coating layer 117. Therefore, when heating is performed by the temperature adjustment portion 115, heat is easily transferred from the temperature adjustment portion 115 to the coating layer 117. Therefore, temperature control by the temperature adjustment portion 115 with respect to a portion of the shaping object in contact with the coating layer 117 can be efficiently performed in a short time.

In the fifth embodiment, the shaping object is shaped by the flow of the shaping step shown in FIG. 5 as in the first embodiment. In the shaping step of the fifth embodiment, by using the shaping stage 110c, a temperature of a portion of the shaping objects in contact with the coating layer 117 having high thermal conductivity can be raised more efficiently in a short time than other portions by the temperature adjustment portion 115 in the step P2. Therefore, in the shaping object, a portion in contact with the peripheral edge portion of the hole portion 112 whose adhesion to the shaping stage 110 is relatively high can be made more softened, and the separation of the shaping object from the shaping stage 110 may be facilitated. In addition, according to the shaping apparatus and the method of manufacturing the shaping object of the fifth embodiment, in addition to the various working effects described in the fifth embodiment, various working effects similar to those described in the first embodiment and the third embodiment can be achieved.

6. Sixth Embodiment

Figure 12:
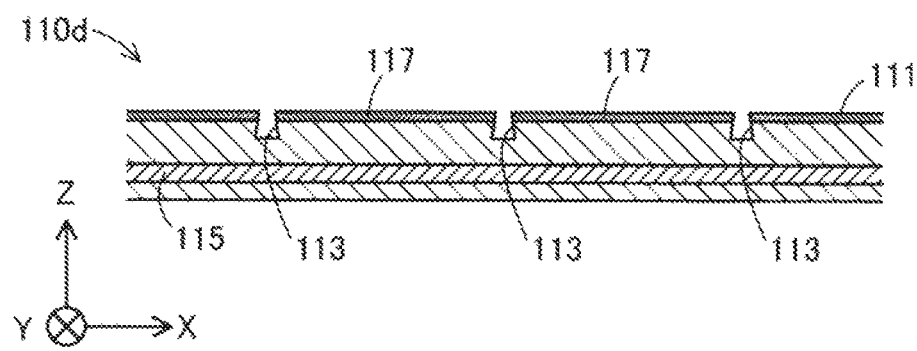
FIG. 12 is a schematic sectional view showing a shaping stage of a sixth embodiment.

FIG. 12 is a schematic sectional view showing a shaping stage 110d provided in a shaping apparatus of a sixth embodiment. A configuration of the shaping apparatus of the sixth embodiment is substantially the same as the configuration of the shaping apparatus 100 of the first embodiment shown in FIG. 1 except that the shaping stage 110d of the sixth embodiment is provided instead of the shaping stage 110. A configuration of the shaping stage 110d of the sixth embodiment is substantially the same as the configuration of the shaping stage 110b of the fourth embodiment except that the coating layer 117 as described in the fifth embodiment is provided on the shaping surface 111.

In the sixth embodiment, the coating layer 117 covers a planar area at the peripheral edge of the groove portion 113 of the shaping stage 110d, that is, an area other than the groove portion 113 in the shaping surface 111. In the sixth embodiment, the shaping object is shaped by the flow of the shaping step shown in FIG. 5 as in the first embodiment. In the shaping step of the sixth embodiment as well, a temperature of a portion of the shaping objects in contact with the coating layer 117 having high thermal conductivity can be raised more efficiently in a short time than other portions by the temperature adjustment portion 115 in the step P2 as described in the fifth embodiment. Therefore, the separation of the shaping object from the shaping stage 110 is further facilitated in the subsequent step P3. In addition, according to the shaping apparatus and the method of manufacturing the shaping object of the sixth embodiment, in addition to the various working effects described in the sixth embodiment, various working effects similar to those described in the first embodiment, the fourth embodiment, and the fifth embodiment can be achieved.

7. Seventh Embodiment

Figure 13:
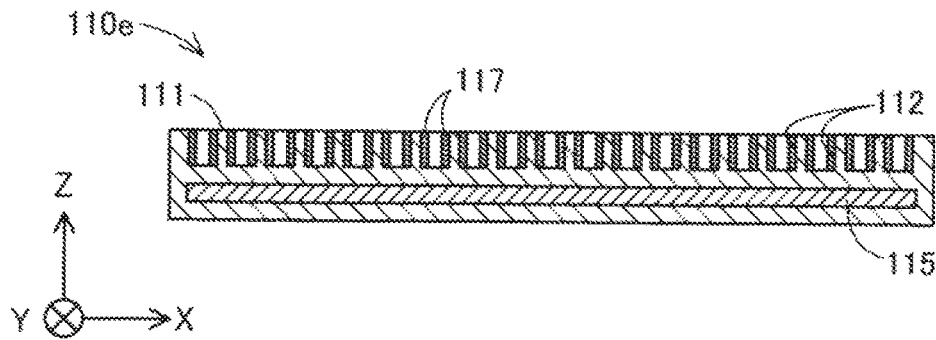
FIG. 13 is a schematic sectional view showing a shaping stage of a seventh embodiment.

FIG. 13 is a schematic sectional view showing a shaping stage 110e provided in a shaping apparatus of a seventh embodiment. A configuration of the shaping apparatus of the seventh embodiment is substantially the same as the configuration of the shaping apparatus 100 of the first embodiment shown in FIG. 1 except that the shaping stage 110e of the seventh embodiment is provided instead of the shaping stage 110. A configuration of the shaping stage 110e of the seventh embodiment is substantially the same as the configuration of the shaping stage 110c of the fifth embodiment shown in FIG. 11 except that an area on which a coating layer 117 is provided is different. In the seventh embodiment, the shaping object is shaped by the flow of the shaping step shown in FIG. 5 as in the first embodiment.

In the shaping stage 110e of the seventh embodiment, the coating layer 117 covers a side wall surface in each hole portion 112, not the peripheral edge portion of the hole portion 112. The coating layer 117 may also cover a bottom surface of each hole portion 112. By providing the coating layer 117 in each hole portion 112, a temperature of a portion embedded in each hole portion 112 of the shaping object can be raised and softened more efficiently in a shorter time than other portions by the heating of the temperature adjustment portion 115 in the step P2. Thus, the anchor effect acting on the shaping object before the step P3 can be efficiently mitigated, and the separation of the shaping object from the shaping stage 110e in the step P3 is further facilitated. In addition, according to the shaping apparatus and the method of manufacturing the shaping object of the seventh embodiment, in addition to the various working effects described in the seventh embodiment, various working effects similar to those described in the first embodiment, the third embodiment, and the fifth embodiment can be achieved.

8. Eighth Embodiment

Figure 14:
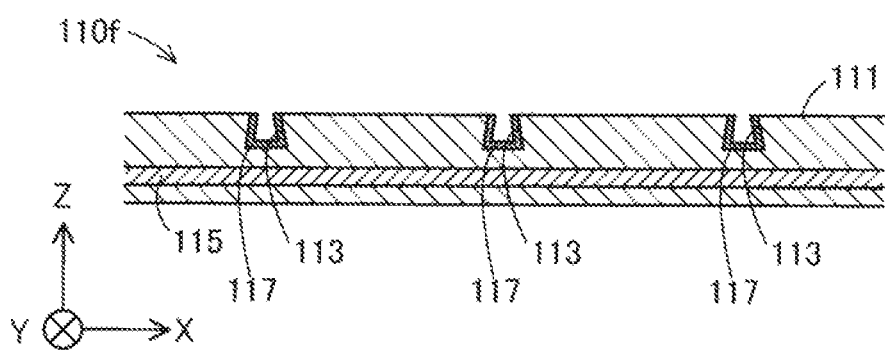
FIG. 14 is a schematic sectional view showing a shaping stage of an eighth embodiment.

FIG. 14 is a schematic sectional view showing a shaping stage 110f provided in a shaping apparatus of a eighth embodiment. A configuration of the shaping apparatus of the eighth embodiment is substantially the same as the configuration of the shaping apparatus 100 of the first embodiment shown in FIG. 1 except that the shaping stage 110f of the eighth embodiment is provided instead of the shaping stage 110. A configuration of the shaping stage 110f of the eighth embodiment is substantially the same as the configuration of the shaping stage 110d of the sixth embodiment including groove portion 113 shown in FIG. 12 except that an area on which a coating layer 117 is provided is different. In the eighth embodiment, the shaping object is shaped by the flow of the shaping step shown in FIG. 5 as in the first embodiment.

In the shaping stage 110f of the eighth embodiment, the coating layer 117 covers an inner wall surface including a side wall surface and a bottom surface of each groove portion 113. As a result, a temperature of a portion embedded in each groove portion 113 of the shaping object can be raised and softened more efficiently in a shorter time than other portions by the heating of the temperature adjustment portion 115 in the step P2. Therefore, even in a configuration in which each groove portion 113 is configured such that the groove width thereof decreases as the groove width approaches a groove opening from a bottom thereof, the separation of the shaping object from the shaping stage 110f in the step P3 can be further facilitated. In addition, according to the shaping apparatus and the method of manufacturing the shaping object of the eighth embodiment, in addition to the various working effects described in the eighth embodiment, various working effects similar to those described in the first embodiment, the fourth embodiment, the fifth embodiment, the sixth embodiment, and the seventh embodiment can be achieved.

9. Ninth Embodiment

Figure 15:
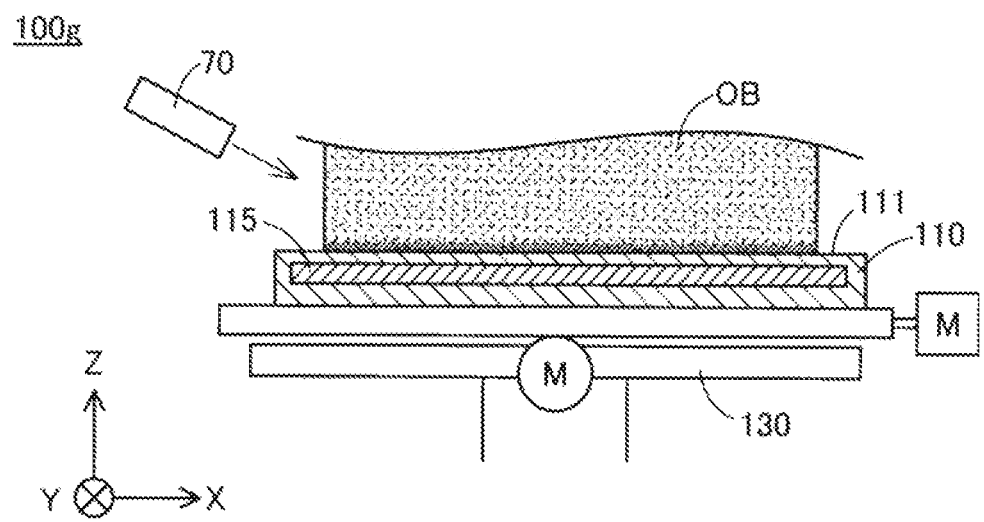
FIG. 15 is a schematic view showing a cooling portion provided in a three-dimensional shaping apparatus of a ninth embodiment.

FIG. 15 is a schematic view showing a cooling portion 70 provided in a shaping apparatus 100g of a ninth embodiment. A configuration of the shaping apparatus 100g of the ninth embodiment is substantially the same as the shaping apparatus 100 of the first embodiment except that the cooling portion 70 is added. The cooling portion 70 is provided above the shaping stage 110, and cools the shaping object OB shaped on the shaping stage 110 under control of the control portion 101. The cooling portion 70 is constituted with, for example, a blower fan.

The shaping step of shaping the shaping object in the ninth embodiment is substantially the same as the shaping step of FIG. 5 described in the first embodiment except that the step P2 includes a cooling step by the cooling portion 70. In the step P2, the control portion 101 heats a lower end portion of the shaping object OB in contact with the shaping stage 110 by the temperature adjustment portion 115 of the shaping stage 110 while cooling the shaping object OB by air blowing from the cooling portion 70 after curing. In FIG. 15, the lower end portion of the shaping object OB is shown as oblique line hatching for convenience. Due to cooling by the cooling portion 70, softening of an upper portion of the shaping object OB by the effect of heating of the temperature adjustment portion 115 is suppressed compared to the lower end portion thereof. Therefore, decrease of shaping precision by thermal deformation of the shaping object OB can be suppressed. According to the shaping apparatus and the method of manufacturing the shaping object of the ninth embodiment, in addition to the various working effects described in the ninth embodiment, various working effects similar to those described in the first embodiment described above can be achieved.

10. Tenth Embodiment

Figure 16:
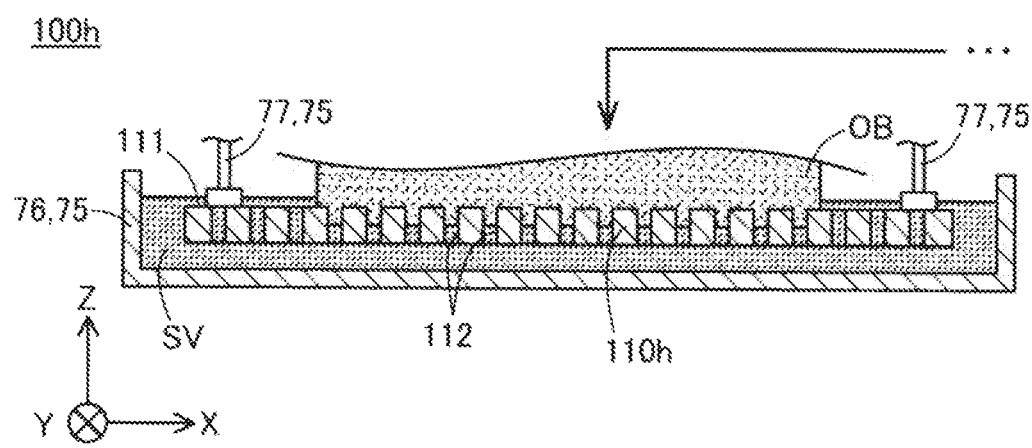
FIG. 16 is a schematic view showing a dissolving portion provided in a three-dimensional shaping apparatus of a tenth embodiment.

FIG. 16 is a schematic view showing a shaping apparatus 100h of a tenth embodiment. A configuration of the shaping apparatus 100h of the tenth embodiment is substantially the same as the configuration of the shaping apparatus 100 of the first embodiment shown in FIG. 1 except that the shaping stage 110h is provided instead of the shaping stage 110a and a dissolving portion 75 is added. However, in FIG. 16, illustration of a constituent portion other than the dissolving portion 75 and the shaping stage 110h included in the shaping apparatus 100h of the tenth embodiment is omitted for convenience. The shaping stage 110h of the tenth embodiment is substantially the same as the configuration of the shaping stage 110c of the third embodiment except that the temperature adjustment portion 115 is omitted and the hole portion 112 is configured as a through hole.

The dissolving portion 75 includes a solvent reservoir 76 in which a solvent SV dissolving the shaping material is reserved, and a transport portion 77 transporting the shaping stage 110h. As the solvent SV of the solvent reservoir 76, an organic solvent such as acetone, may be adopted, for example. In addition, as a solvent SV, what was suitably selected may be adopted according to a type of a resin material contained in the shaping material as follows. For example, when the shaping material contains an ABS resin, methyl ethyl ketone can be adopted as the solvent SV. When the shaping material contains a styrene resin, trichloroethane can be adopted as the solvent SV. When the shaping material contains a polyvinyl chloride resin, tetrahydric furan can be adopted as the solvent SV. When the shaping material contains a cellulose resin, isoamyl acetate can be adopted as the solvent SV.

The transport portion 77 is constituted with, for example, a robot arm including a chuck member. The transport portion 77 separates the shaping stage 110h from the moving portion 130 under the control of the control portion 101, transports the shaping stage 110h to the solvent reservoir 76, and immerses the shaping stage 110h in the solvent SV.

Figure 17:
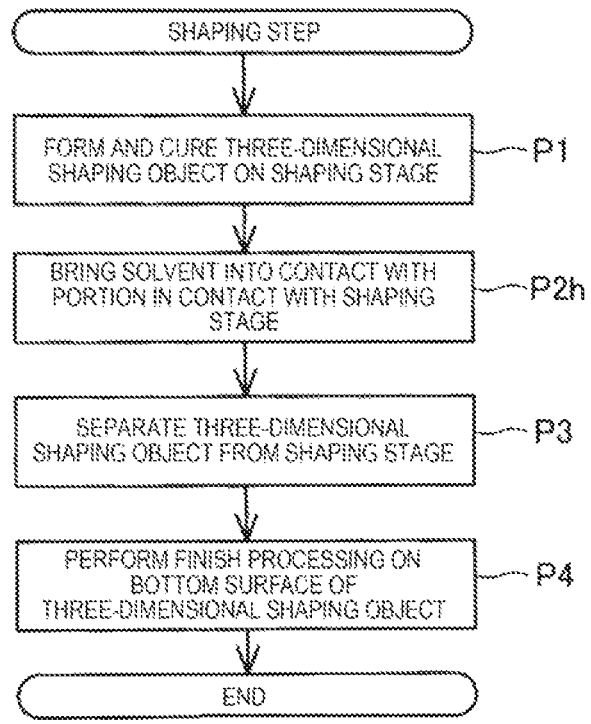
FIG. 17 is an explanatory view showing a flow of a shaping step according to the tenth embodiment.

A shaping step of the tenth embodiment will be described with reference to FIG. 17 in addition to FIG. 16. FIG. 17 is an explanatory view showing a flow of the shaping step in the tenth embodiment. The shaping step in the tenth embodiment is substantially the same as the shaping step of FIG. 5 described in the first embodiment except that a step P2h using the dissolving portion 75 is provided instead of the step P2.

After the shaping object OB is shaped on the shaping stage 110h in the step P1, in the step P2h, the control portion 101 brings the solvent SV into contact with a portion of the shaping object OB in contact with the shaping stage 110h by the dissolving portion 75. The control portion 101 causes the transport portion 77 of the dissolving portion 75 to transport the shaping stage 110h, in which the shaping object OB is disposed on the shaping surface 111, to the solvent reservoir 76. The transport portion 77 immerses the shaping stage 110h into the solvent SV of the solvent reservoir 76, and brings the solvent SV into contact with the portion of the shaping object OB in contact with the shaping stage 110h. In the shaping stage 110h, since the hole portion 112 is constituted with a through hole, the solvent SV can also enter the hole portion 112, in which an opening on the shaping surface 111 side is closed by the shaping object OB, from an opening on the opposite side to the shaping surface 111.

The contact of the solvent SV dissolves and softens a portion of the shaping object OB in contact with the shaping stage 110h, so that adhesion of the shaping object OB to the shaping stage 110h can be reduced. Therefore, in the step P3, the shaping object OB can be easily separated from the shaping stage 110h. In addition, according to the shaping apparatus and the method of manufacturing the shaping object of the tenth embodiment, in addition to the various working effects described in the tenth embodiment, various working effects similar to those described in each of the embodiments described above can be achieved.

11. Eleventh Embodiment

Figure 18:
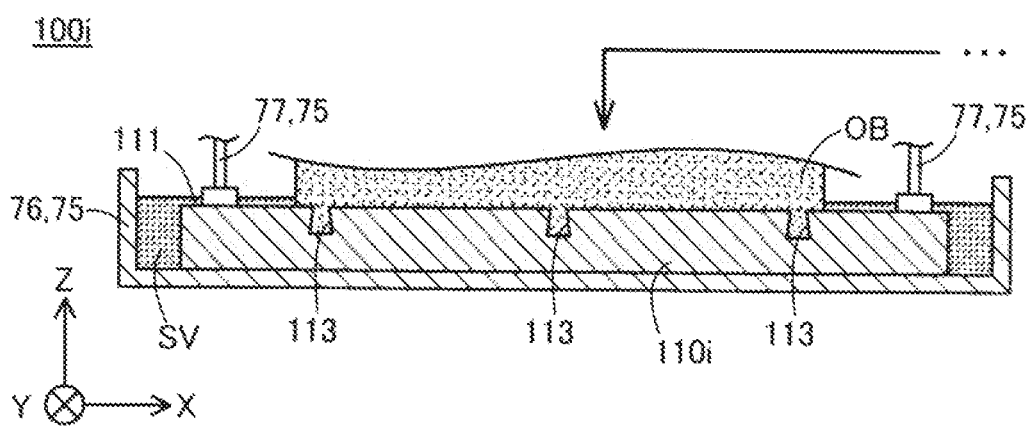
FIG. 18 is a schematic view showing a dissolving portion provided in a three-dimensional shaping apparatus of an eleventh embodiment.

FIG. 18 is a schematic view showing a shaping apparatus 100i of an eleventh embodiment. A configuration of the shaping apparatus 100i of the eleventh embodiment is substantially the same as the shaping apparatus 100h of the tenth embodiment except that the shaping stage 110i of the eleventh embodiment is provided instead of the shaping stage 110h. A configuration of the shaping stage 110i of the eleventh embodiment is substantially the same as the shaping stage 110h of the tenth embodiment except that the groove portion 113 as described in the fourth embodiment is provided instead of the hole portion 112.

A shaping step in the eleventh embodiment is substantially the same as the flow described in the tenth embodiment, and after dissolving a portion of the shaping object OB in contact with the shaping stage 110i by the dissolving portion 75, the shaping object OB is separated from the shaping stage 110i. In the case of the shaping stage 110i of the eleventh embodiment, the solvent SV of the dissolving portion 75 can be transmitted through the groove portion 113 of the shaping stage 110i to be brought into contact with a portion of the shaping object OB embedded in the groove portion 113. In addition, according to the shaping apparatus and the method of manufacturing the shaping object of the eleventh embodiment, in addition to the various working effects described in the eleventh embodiment, various working effects similar to those described in each of the embodiments described above can be achieved.

12. Other Embodiments

The various configurations described in each of the embodiments described above can be modified, for example, as follows. All other embodiments described below are regarded as an example of a mode for carrying out the technology of the present disclosure, similar to each of the embodiments described above and the configurations described as other embodiments in the embodiments described above.

(1) Another Embodiment 1

In the shaping apparatus of the third embodiment, the fourth embodiment, the fifth embodiment, the sixth embodiment, the seventh embodiment, and the eighth embodiment, the temperature adjustment portion 115 may cool the shaping object as described in the second embodiment. Even in this case, adhesion of the shaping object with respect to the shaping surface 111 can be reduced by thermal shrinkage of the portion of the shaping object in contact with the shaping stages 110a, 110b, 110c, 110d, 110e and 110f. Therefore, it is possible to easily separate the shaping object from the shaping stages 110a, 110b, 110c, 110d, 110e and 110f. In particular, in the shaping stages 110c, 110d, 110e, and 110f of the fifth embodiment, the sixth embodiment, the seventh embodiment, and the eighth embodiment of the temperature adjustment portion 115 can efficiently cool the portion of the shaping object in contact with the coating layer 117 in a short time.

(2) Another Embodiment 2

Figure 19:
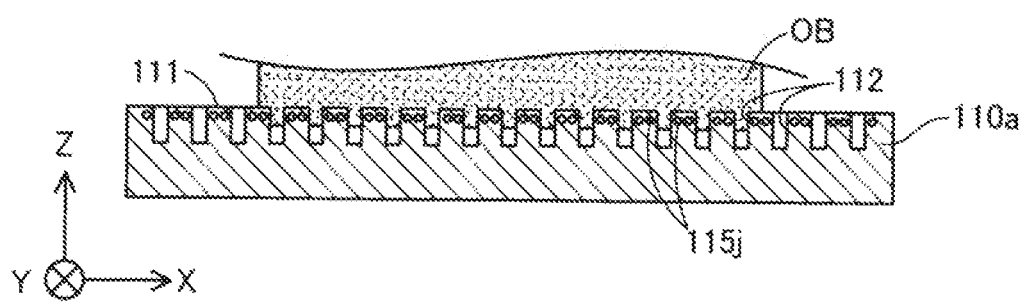
FIG. 19 is a schematic sectional view showing a configuration of a temperature adjustment portion in another embodiment.
Figure 20:
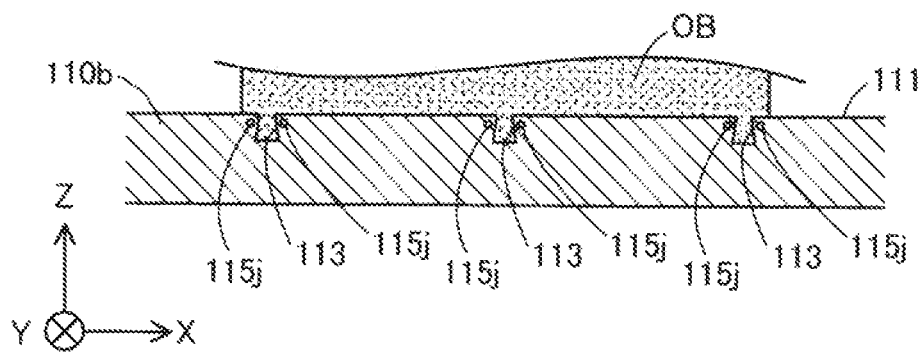
FIG. 20 is a schematic sectional view showing a configuration of a temperature adjustment portion in another embodiment.

FIGS. 19 and 20 are schematic sectional views showing shaping stages 110a and 110b having a temperature adjustment portion 115*j* as different embodiments, respectively. In the third embodiment and the fourth embodiment, the shaping stages 110*a* and 110*b* may be constituted with the temperature adjustment portion 115*j*, instead of the temperature adjustment portion 115, which are disposed along an outer circumferential side of the hole portion 112 and the groove portion 113 and have at least one function of a heating portion and a cooling portion. The temperature adjustment portion 115*j* is constituted with, for example, a heating wire, a heat exchange tube in which a heat fluid or a refrigerant flows, a peltier element, or the like. By using the temperature adjustment portion 115*j*, inner wall surfaces of the hole portion 112 and the groove portion 113 are heated so that the temperature thereof is higher than that of the other parts of the shaping stages 110*a* and 110*b*, or cooled so that the temperature thereof is lower than that of the other parts of the shaping stages 110*a* and 110*b*. A configuration of the temperature adjustment portion 115*j* in the present embodiment may be applied to the shaping apparatus of the fifth embodiment, the sixth embodiment, the seventh embodiment, and the eighth embodiment described above.

(3) Another Embodiment 3

The coating layer 117 described in the fifth embodiment may be applied to the shaping stage 110 of the first embodiment. In this case, the coating layer 117 may cover part or all area of the shaping surface 111 of the shaping stage 110. In the shaping stages 110*c* and 110*d* of the fifth embodiment and the sixth embodiments described above, the coating layer 117 may cover an inner wall surface of the hole portion 112 or an inner wall surface of the groove portion 113 in addition to the peripheral edge portion of the hole portion 112 or the peripheral edge portion of the groove portion 113.

(4) Another Embodiment 4

The cooling portion 70 described in the ninth embodiment may be applied to the shaping apparatus of the third embodiment, the fourth embodiment, the fifth embodiment, the sixth embodiment, the seventh embodiment, and the eighth embodiment. As a result, deformation of a portion other than the lower end portion of the shaping object OB by the heating of the temperature adjustment portion 115 may be suppressed. The cooling portion 70 may be used to cure the shaping object in the step P1.

(5) Another Embodiment 5

In the tenth embodiment and the eleventh embodiment, the hole portion 112 and the groove portion 113 of the shaping stages 110*h* and 110*i* may be omitted. Even in this case, the adhesion of the shaping object OB to the shaping stages 110*h* and 110*i* can be reduced by the solvent SV being inserted into a boundary between the shaping stages 110*h* and 110*i* and the shaping object OB from an outer peripheral end of the lower end portion of the shaping object. The tenth embodiment and the eleventh embodiment may include a configuration such that the dissolving portion 75 supplies the solvent SV on the shaping surface 111 and transmits the solvent SV on the shaping surface 111, so that the solvent SV is brought into contact with a portion of the shaping object OB in contact with the shaping stage 110*h* and 110*i*. In the tenth embodiment and the eleventh embodiment, the surface of the shaping stages 110*h* and 110*i* may be coated with a protective layer for suppressing dissolving of the shaping stages 110*h* and 110*i* by solvent SV.

(6) Another Embodiment 6

In each of the embodiments described above, the generation portion 30 may have, for example, a configuration in which the shaping material is extruded from the nozzle by rotating an in-line screw whose length in the Z direction is longer than a diameter thereof instead of a configuration using the flat screw 40. Further, the shaping apparatus 100 may not adopt a configuration using the flat screw 40 or the in-line screw described above but adopt the FDM method (heat fused deposition method) in related art. The shaping apparatus 100 may adopt a configuration such that a filament is drawn out from a bobbin, on which the filament made of a thermoplastic resin is wound, to a nozzle, a heater provided in the nozzle melts the filament, and the shaping material is discharged from the nozzle.

(7) Another Embodiment 7

In each of the embodiments described above, the material supply portion 20 may have a configuration including a plurality of the hoppers. In this case, different materials may be supplied from each hopper to the flat screw 40 and mixed in the scroll groove 42 of the flat screw 40 to produce the shaping material. For example, a powder material to be a main material described in the above embodiment, and a solvent, a binder, or the like added thereto may be supplied to the flat screw 40, in parallel from separate hoppers.

(8) Another Embodiment 8

In the shaping apparatus of each of the embodiments described above, one appropriately selected from materials described below may be used as the material MR. However, in the configuration in which the lower end portion of the shaping object OB is heated or cooled by the temperature adjustment portion 115, it is desirable to select one which is thermally deformed by the heating or cooling by the temperature adjustment portion 115. Further, in the configuration in which the lower end portion of the shaping object OB is dissolved by the solvent SV of the dissolving portion 75, it is desirable to select a material which can be dissolved by the solvent SV.

The shaping object shaped in the shaping apparatus of each of the embodiments described above can be shaped, for example, with various materials such as a material having thermoplasticity, a metal material, and a ceramic material as a main material. Here, a "main material" means a central material which forms a shape of the shaping object, and means a material which accounts for a content of 50% by weight or more in the shaping object. The shaping material described above includes one in which the main material is melted alone, and one in which a part of the components contained together with the main material is melted and made into a paste.

When a material having thermoplasticity is used as the main material, the shaping material is generated in the generation portion 30 by plasticizing the material. As the material having thermoplasticity, for example, the following thermoplastic resin material can be used.
Examples of thermoplastic resin materials:
General purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyetheretherketone (PEEK), polycarbonate (PC), modified polyphenylene ether, polybutylene terephthalate, and polyethylene terephthalate, or engineering plastics such as polysulfone, polyether sulfone, polyphenylene sulfide, polyarylate, polyimide, polyamide imide, polyether imide, and polyether ether ketone In the material having thermoplasticity, additives such as a wax, a flame retardant, an antioxidant, and a heat stabilizer may be mixed with pigments, a metal, a ceramic, or the like. The thermoplastic material is plasticized and converted to a melted state in the generation portion 30 by the rotation of the flat screw 40 and the heating of the heater 58. The shaping material generated by the melting of the thermoplastic material is discharged from the nozzle 61 and then cured by a decrease in temperature.

It is desirable that the material having thermoplasticity is ejected from the nozzle 61 in a completely melted state by being heated to a temperature higher than or equal to a glass transition point thereof. For example, it is desirable that the ABS resin which has a glass transition point of about 120° C. is at about 200° C. when discharged from the nozzle 61. A heater may be provided around the nozzle 61 in order to discharge the shaping material in such a high temperature state.

In the shaping apparatus 100, for example, a powder material obtained by powdering the following metal material may be mixed into the thermoplastic material described above.

Examples of Mixed Metal Materials:

A single metal of magnesium (Mg), iron (Fe), cobalt (Co), chromium (Cr), aluminum (Al), titanium (Ti), copper (Cu), and nickel (Ni), or an alloy containing one or more of these metals Examples of the Alloys Described Above:

Maraging steel, stainless steel, cobalt chromium molybdenum, titanium alloy, nickel alloy, aluminum alloy, cobalt alloy, and cobalt chromium alloy In the shaping apparatus 100, it is possible to mix powder of a ceramic material instead of the metal material described above. As the ceramic material, for example, oxide ceramics such as silicon dioxide, titanium dioxide, aluminum oxide and zirconium oxide, and non-oxide ceramics such as aluminum nitride can be used.

The powder material of the metal material or the ceramic material may be a single metal powder and an alloy powder, or a mixed material produced by mixing a plurality of types of ceramic material powders. Further, the powder material of the metal material or the ceramic material may be coated with, for example, a thermoplastic resin as exemplified above, or other thermoplastic resins. In this case, the thermoplastic resin may be melted to develop fluidity in the generation portion 30.

For example, the following solvent may be added to the powder material of the metal material or the ceramic material. The solvent can be used by combining 1 type, or 2 or more types selected from the following.

Examples of Solvent:

Water, (poly) alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene and xylene, ketones such as methyl ethyl ketone, acetone, methyl isobutyl ketone, ethyl n-butyl ketone, diisopropyl ketone and acetylacetone, alcohols such as ethanol, propanol and butanol, tetraalkyl ammonium acetates, sulfoxide solvents such as dimethyl sulfoxide and diethyl sulfoxide, pyridine solvents such as gin, γ-picoline and 2,6-lutidine, and ionic liquids such as tetraalkyl ammonium acetate (for example, tetrabutyl ammonium acetate or the like) and butyl carbitol acetate In addition, for example, the following binder may be added to the powder material of the metal material or the ceramic material introduced as the material MR into the material supply portion 20.

Examples of Binders:

Acrylic resin, epoxy resin, silicone resin, cellulose resin or other synthetic resin, or PLA (polylactic acid), PA (polylactic acid), PPS (polyphenylene sulfide), PEEK (polyether ether ketone) or other thermoplastic resin

13. Other Aspects

The technology of the present disclosure is not limited to each of the embodiments or examples described above, and can be realized with various aspects in the range without departing from the gist thereof. For example, the technology of the present disclosure can be implemented as the following aspects. The technical features in each of the embodiments described above corresponding to the technical features in each of aspects described below may be replaced or combined as appropriate in order to solve part or all of the problems which the technology of the present disclosure includes or to accomplish part of all of the effects which the technology of the present disclosure achieves. In addition, unless the technical feature is described as essential in the present disclosure, the technical feature can be deleted as appropriate.

(1) A first aspect is provided as a three-dimensional shaping apparatus. The three-dimensional shaping apparatus of the first aspect includes a discharge portion discharging a shaping material, a shaping stage on which the shaping material discharged from the discharge portion is stacked, a moving portion changing a relative position between the discharge portion and the shaping stage, a temperature adjustment portion provided in the shaping stage to adjust a temperature of the shaping stage, and a control portion controlling the discharge portion, the moving portion, and the temperature adjustment portion, in which the control portion stacks the shaping material on the shaping stage to shape and cure a three-dimensional shaping object while changing the relative position between the discharge portion and the shaping stage, and then, heats or cools a portion of the cured three-dimensional shaping object in contact with the shaping stage by controlling the temperature adjustment portion to adjust a temperature of the shaping stage.

According to the three-dimensional shaping apparatus of the first aspect, the portion of the three-dimensional shaping object in contact with the shaping stage is heated to be softened, or is cooled to be thermally shrunk to reduce adhesion of the three-dimensional shaping object with respect to the shaping stage. Therefore, separation of the three-dimensional shaping object from the shaping stage can be easily performed, and occurrence of deformation and breakage of the three-dimensional shaping object can be suppressed.

(2) In the three-dimensional shaping apparatus of the aspect described above, the shaping material may contain a thermoplastic resin, and the control portion may control the temperature adjustment portion to heat a portion of the three-dimensional shaping object in contact with the shaping stage at a temperature which is higher than a glass transition point of the thermoplastic resin and lower than a melting point of the thermoplastic resin.

According to the three-dimensional shaping apparatus of the aspect, heating by the temperature adjustment portion can further soften the portion of the three-dimensional shaping object in contact with the shaping stage. Therefore, separation of the three-dimensional shaping object from the shaping stage can be performed more easily.

(3) In the three-dimensional shaping apparatus of the aspect described above, the shaping stage may have a plurality of hole portions or a plurality of groove portions in an area on which the shaping material is stacked.

According to the three-dimensional shaping apparatus of the aspect, since during shaping of the shaping object, a fixing property of the shaping material to the shaping stage can be enhanced by a part of the shaping material being inserted into the hole portion or the groove portion of the shaping stage, shaping precision of the shaping object can be enhanced.

(4) In the three-dimensional shaping apparatus of the aspect, the shaping stage may have a coating layer higher in thermal conductivity than other parts of the shaping stage, the coating layer being obtained by coating at least a part of an area on which the shaping material is stacked.

According to the three-dimensional shaping apparatus of the aspect, the portion of the shaping object in contact with a coating portion can be efficiently heated or cooled by the temperature adjustment portion.

(5) In the three-dimensional shaping apparatus of the aspect, the coating layer may coat an inner wall surface of the hole portion or an inner wall surface of the groove portion.

According to the three-dimensional shaping apparatus of the aspect, the portion of the shaping object being inserted into the hole portion or the groove portion can be efficiently heated or cooled by the temperature adjustment portion. Therefore, a corresponding portion softened by heating or shrunk by cooling can be easily separated from the groove portion or the hole portion.

(6) In the three-dimensional shaping apparatus of the aspect, the temperature adjustment portion may be disposed along an outer circumference of the hole portion or the groove portion.

According to the three-dimensional shaping apparatus of the aspect, since the portion of the shaping object being inserted into the hole portion or the groove portion of the shaping stage can be efficiently heated or cooled by the temperature adjustment portion, the shaping object can be easily separated from the shaping stage.

(7) The three-dimensional shaping apparatus of the aspect further includes a cooling portion cooling the three-dimensional shaping object shaped on the shaping stage, and the control portion may cool the cured three-dimensional shaping object by the cooling portion while heating the portion of the cured three-dimensional shaping object in contact with the shaping stage by the temperature adjustment portion.

According to the three-dimensional shaping apparatus of the aspect, it is possible to suppress softening and deformation of a portion other than the portion of the shaping object in contact with the shaping stage by heating of the temperature adjustment portion.

(8) A second aspect is provided as a method of manufacturing a three-dimensional shaping object. The method of manufacturing of the second aspect includes shaping and curing a three-dimensional shaping object on a shaping stage by discharging and stacking a shaping material from a discharge portion toward the shaping stage while changing a relative position between the discharge portion and the shaping stage, and separating the three-dimensional shaping object from the shaping stage by heating or cooling a portion of the cured three-dimensional shaping object in contact with the shaping stage.

According to the method of manufacturing of the three-dimensional shaping object of the second aspect, a portion of the three-dimensional shaping object in contact with the shaping stage is heated to be softened, or cooled to be thermally shrunk to reduce adhesion of the three-dimensional shaping object with respect to the shaping stage. Therefore, separation of the three-dimensional shaping object from the shaping stage can be easily performed, and occurrence of deformation and breakage of the three-dimensional shaping object can be suppressed.

(9) The third aspect is provided as a three-dimensional shaping apparatus. The three-dimensional shaping apparatus of the third aspect includes a discharge portion discharging a shaping material, a shaping stage on which the shaping material discharged from the discharge portion is stacked, a moving portion changing a relative position between the discharge portion and the shaping stage, a solvent reservoir in which a solvent dissolving the shaping material is reserved, a transport portion transporting the shaping stage to the solvent reservoir, and a control portion controlling the discharge portion, the moving portion, and the transport portion, in which the control portion stacks the shaping material on the shaping stage to shape and cure a three-dimensional shaping object while changing the relative position between the discharge portion and the shaping stage, and then, transports the shaping stage on which the cured three-dimensional shaping object is disposed to the solvent reservoir by the transport portion, and brings the solvent into contact with a portion of the three-dimensional shaping object in contact with the shaping stage.

According to the three-dimensional shaping apparatus of the third aspect, adhesion of the three-dimensional shaping object with respect to the shaping stage can be reduced by dissolving the portion of the three-dimensional shaping object in contact with the shaping stage. Therefore, separation of the three-dimensional shaping object from the shaping stage can be easily performed, and occurrence of deformation and breakage of the three-dimensional shaping object can be suppressed.

(10) A fourth aspect is a method of manufacturing a three-dimensional shaping object, the method of manufacturing includes shaping and curing a three-dimensional shaping object on a shaping stage by discharging and stacking a shaping material from a discharge portion toward the shaping stage while changing a relative position between the discharge portion and the shaping stage, and separating the three-dimensional shaping object from the shaping stage by dissolving a portion of the cured three-dimensional shaping object in contact with the shaping stage by a solvent dissolving the shaping material after curing the three-dimensional shaping object.

According to the method of manufacturing a three-dimensional shaping object of the fourth aspect, adhesion of the three-dimensional shaping object with respect to the shaping stage can be reduced by dissolving the portion of the three-dimensional shaping object in contact with the shaping stage. Therefore, separation of the three-dimensional shaping object from the shaping stage can be easily performed, and occurrence of deformation and breakage of the three-dimensional shaping object can be suppressed.

(11) The method of manufacturing the three-dimensional shaping object of the aspect further includes cutting or polishing a bottom surface of the three-dimensional shaping object in contact with the shaping stage after separating the three-dimensional shaping object from the shaping stage.

According to the method of manufacturing of the aspect, shaping precision of the three-dimensional shaping object can be enhanced.

What is claimed is:

1. A three-dimensional shaping apparatus comprising:
    a discharge head discharging a shaping material;
    a shaping stage on which the shaping material discharged from the discharge head is stacked;
    a moving positioner changing a relative position between the discharge head and the shaping stage by driving force of a motor;
    a temperature adjustment element provided in the shaping stage to adjust a temperature of the shaping stage;
    a memory configured to store a program; and
    a processor configured to execute the program so as to:
        cause the discharge head to discharge the shaping material on the shaping stage to complete a three-dimensional shaping object on the shaping stage while causing the moving positioner and the motor to change the relative position between the discharge head and the shaping stage;
        leave the completed three-dimensional shaping object on the shaping stage for a predetermined period of time to cure the completed three-dimensional shaping object; and
        cause the temperature adjustment element to heat the shaping stage so as to increase a temperature of a bottom part of the cured completed three-dimensional shaping object that contacts the shaping stage,
    wherein the shaping material includes a thermoplastic resin, and
    the increased temperature of the bottom part of the cured completed three-dimensional shaping object is higher than a glass transition point of the thermoplastic resin and lower than a melting point of the thermoplastic resin.

2. The three-dimensional shaping apparatus according to claim 1, wherein
    the shaping stage has a plurality of holes or a plurality of grooves in an area of the shaping stage on which the shaping material is stacked.

3. The three-dimensional shaping apparatus according to claim 1, wherein
    the shaping stage has a coating layer that coats at least a part of an area of the shaping stage on which the shaping material is stacked, and
    the coating layer has a higher thermal conductivity than the shaping stage.

4. The three-dimensional shaping apparatus according to claim 3, wherein
    the shaping stage has a plurality of holes or a plurality of grooves in an area of the shaping stage on which the shaping material is stacked, and
    the coating layer coats an inner wall surface of the plurality of holes or an inner wall surface of the plurality of grooves.

5. The three-dimensional shaping apparatus according to claim 2, wherein
    the temperature adjustment element is disposed along an outer circumference of the area of the plurality of holes or the plurality of grooves.

6. The three-dimensional shaping apparatus according to claim 1, further comprising:
    a cooler disposed above the shaping stage, the cooler cooling the cured completed three-dimensional shaping object shaped on the shaping stage, wherein
    the processor is configured to cause the cooler to cool another part of the cured completed three-dimensional shaping object while the processor causes the temperature adjustment element to heat the shaping stage so as to increase the temperature of the bottom part of the cured completed three-dimensional shaping object, and
    the another part of the cured completed three-dimensional shaping object is other than the bottom part of the cured completed three-dimensional shaping object.

* * * * *